Patented Apr. 3, 1951

2,547,012

UNITED STATES PATENT OFFICE 2,547,012

PREPARATION OF THIOPHOSPHORYL CHLORIDE

Oscar H. Johnson, Medina, N. Y., assignor to Food Machinery and Chemical Corporation, San Jose, Calif., a corporation of Delaware No Drawing. Application August 3, 1948,
Serial No. 42,341

9 Claims. (Cl. 23—14)

The present invention relates to the manufacture of thiophosphoryl chloride and more particularly to a procedure for making thiophosphoryl chloride under atmospheric pressure.

Thiophosphoryl chloride, $PSCl_3$, has become an extremely important chemical intermediate for use in the manufacture of many chemical compounds, not the least important of which are certain esters of mono-thiophosphoric acid employed in the preparation of insecticidal formulations.

Thiophosphoryl chloride has been manufactured commercially heretofore in what might be called a vapor stage process by the reaction of elemental sulfur upon phosphorus trichloride in a closed system and under high pressure. This process suffers all of the disadvantages inherent in high pressure operations generally and, although theoretically the reaction should proceed smoothly to completion with no by-products, this is not always the case.

It is an object of the present invention to provide a method for the preparation of thiophosphoryl chloride which proceeds in liquid phase at atmospheric pressure.

It is also an object of the invention to provide a procedure for manufacturing thiophosphoryl chloride wherein reactants of crude or technical grade may be employed and wherein the yield is substantially theoretical with the production of no significant amounts of by-products excepting those which may be present as contaminants in the reactants initially employed in the preparation of the desired end product.

In accordance with the present invention thiophosphoryl chloride with a boiling point of 120–124° C. may be prepared by heating a mixture of sulfur monochloride, phosphorus trichloride, and a polysulfide of phosphorus such as phosphorus pentasulfide. These products are readily available on the market and at advantageous prices, particularly in the technical state and may be employed without further purification. By the reaction of 1 mole of phosphorus pentasulfide, 3 moles of sulfur monochloride and 9 moles of phosphorus trichloride there results approximately 11 moles of thiophosphoryl chloride. The chemical reaction appears to proceed in accordance with the following theoretical equation:

$$9PCl_3 + 3S_2Cl_2 + P_2S_5 \rightarrow 11PSCl_3$$

Thus, if the phosphorus trichloride be used in a quantity greater than that indicated in the equation, the thiophosphoryl chloride produced will be contaminated with the excess phosphorus trichloride. If the sulfur monochloride be used in a quantity greater than that indicated by the equation, it likewise will be found unchanged and the thiophosphoryl chloride will be contaminated with sulfur monochloride which imparts thereto a rather distinctive yellow color.

In performing the reaction the three ingredients are merely heated together. It appears to be immaterial how the reactants are mixed or the order in which they are added to the reaction vessel. In general they will be mixed in a closed vessel provided with a reflux condenser and heated until a constant boiling mixture is obtained. Refluxing will begin at a temperature of about 75–80° C. and heating is continued until an internal temperature of 122–124° C. is obtained in the reaction mixture, at which time the chemical reaction is essentially complete. The reaction is probably slightly exothermic but appears to be readily controllable as the reaction proceeds slowly and is complete after a period of about five hours, that is, when the internal temperature of the mixture reaches the range 122–124° C.

After the desired internal temperature is reached and the reaction is complete, the reaction mixture is then distilled with the production of thiophosphoryl chloride, a small residue of solid gritty material remaining in the flask, which residue appears to be the impurities originally present in the reactants.

The following specific example will serve to illustrate the principles of the invention. It is not deemed to be limitative of the invention since it will be apparent that the quantities of materials may be varied provided the ratio thereof is kept essentially within the mole ratio indicated.

Example

To a flask equipped with a reflux condenser and a thermometer adaptor for insertion of a thermometer into the body of a liquid was added 495 g. (3.6 mole) of phosphorus trichloride of boiling point 74–76° C., 89 g. (0.4 mole) of phosphorus pentasulfide and 162 g. (1.2 mole) of sulfur monochloride of boiling point 135–138° C. The flask was heated and refluxing began when the internal temperature reached 80° C. Heating was continued for five hours, during which time the internal temperature of the mixture rose gradually to a temperature of 124° C. Further heating did not raise the internal temperature. The condenser was then set for distillation and the contents of the container were distilled. 693 g. of distillate was obtained of a constant boiling point 120–124° C. The refractive index of this product was determined at 27° C. to be 1.5595. These physical constants correspond with those of thiophosphoryl chloride. The distilled product possessed all of the typical chemical properties of thiophosphoryl chloride and could be used in the manufacture of esters of mono-thiophosphoric acid. The yield in the above example was 93% based upon an assumed 100% purity of the reactants. A slight solid gritty residue remained in the distillation flask which appeared to be merely impurities associated with the technical grade of materials used in the preparation of the desired end product.

Although the reaction between phosphorus trichloride, phosphorus polysulfide, and sulfur monochloride appears to proceed smoothly, some advantage in time may be obtained by carrying out the reaction in an inert solvent, such as benzol or toluol, or other inert organic solvent. The reaction may also be carried out in thiophosphoryll chloride itself as a solvent, if it be desired to moderate the reaction rate.

Although it has been indicated above in accordance with the invention that the three components of the reaction are heated together, it is possible to prepare thiophosphoryl chloride by adding any two of the three components first to the reacting vessel to cause reaction therebetween and subsequently adding the third reactant and heating as before until the internal temperature reaches 124° C. The fact that thiophosphoryl chloride is the final end product is believed to indicate that the equation given above is truly representative and that probably a series of complex oxidation-reduction reactions occur, which undoubtedly proceed through several intermediate stages with the ultimate formation of thiophosphoryl chloride as the product most stable for this system.

Where it is believed that the end product of the reaction is contaminated with one of the chlorides employed in its manufacture, either phosphorus trichloride or sulfur monochloride, an amount of water sufficient to hydrolyze such chloride may be added to the final reaction product prior to its distillation.

As the hydrolytic rate of either phosphorus trichloride or sulfur monochloride is much more rapid than that of thiophosphoryl chloride the former are hydrolyzed and the latter distills over unchanged but uncontaminated with either of the chlorides used as initial reactants. In general about 0.5% to 1% of water is sufficient when following the quantities given in the example above.

What is claimed is:

1. The method of producing thioiphosphoryl chloride which comprises heating a reaction mixture containing phosphorus pentasulfide, sulfur monochloride and phosphorus trichloride under conditions where vapors do not escape therefrom and until thiophosphoryl chloride is formed and thereafter separating the latter.

2. The method of producing thiophosphoryl chloride which comprises adding phosphorus pentasulfide, sulfur monochloride and phosphorus trichloride to a reaction vessel and heating the reaction mixture under conditions where vapors do not escape therefrom and until a product is produced having a constant boiling point consisting substantially of thiophosphoryl chloride and thereafter separating the latter.

3. The method of producing the thiophosphoryl chloride which comprises heating a reaction mixture containing phosphorus pentasulfide, sulfur monochloride and phosphorus trichloride under reflux until thiophosphoryl chloride is produced and separating the latter from the remainder of the mixture.

4. The method of producing thiophosphoryl chloride which comprises heating a reaction mixture containing phosphorus pentasulfide, sulfur monochloride and phosphorus trichloride under reflux until thiophosphoryl chloride is produced and thereafter distilling the latter from the reaction mixture.

5. The method of producing thiophosphoryl chloride which comprises heating a reaction mixture containing phosphorus pentasulfide, sulfur monochloride and phosphorus trichloride under reflux until thiophosphoryl chloride is produced and thereafter adding water to the reaction mixture to hydrolyze unreacted chloride and distilling thiophosphoryl chloride from the mixture.

6. The method of producing thiophosphoryl chloride which comprises heating a reaction mixture containing approximately 9 moles of phosphorus trichloride and 3 moles of sulfur monochloride for each mole of phosphorus pentasulfide under reflux until thiophosphoryl chloride is obtained.

7. The method of producing thiophosphoryl chloride which comprises heating a reaction mixture containing approximately 9 moles of phosphorus trichloride and 3 moles of sulfur monochloride for each mole of phosphorus pentasulfide under reflux until a temperature of approximately 124° C. is reached.

8. The method of producing thiophosphoryl chloride which comprises heating a reaction mixture containing approximately 9 moles of phosphorus trichloride and 3 moles of sulfur monochloride for each mole of phosphorus pentasulfide under reflux until a temperature of approximately 124° C. is reached and thereafter distilling off the thiophosphoryl chloride.

9. The method of producing thiophosphoryl chloride which comprises heating a reaction mixture containing approximately 9 moles of phosphorus trichloride and 3 moles of sulfur monochloride for each mole of phosphorus pentasulfide under reflux until a temperature of approximately 124° C. is reached, thereafter adding water to the mixture to hydrolyze unreacted chloride and subsequently distilling off the thiophosphoryl chloride.

OSCAR H. JOHNSON.

REFERENCES CITED

The following references are of record in the file of this patent:

UNITED STATES PATENTS

| Number | Name | Date |
|---|---|---|
| 1,921,370 | North | Aug. 8, 1933 |

OTHER REFERENCES

Mellor, "Comprehensive Treatise on Inorganic and Theoretical Chemistry," Longmans, Green & Co., London, 1931, vol. 8, page 1074.